United States Patent
Miyasaka et al.

(10) Patent No.: US 6,891,630 B1
(45) Date of Patent: May 10, 2005

(54) IMAGE RECORDING METHOD AND IMAGE RECORDING APPARATUS

(75) Inventors: Toru Miyasaka, Hitachi (JP); Masashi Yamamoto, Hitachi (JP); Akira Shimada, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 936 days.

(21) Appl. No.: 09/595,891

(22) Filed: Jun. 20, 2000

(30) Foreign Application Priority Data

Jun. 23, 1999 (JP) .......................................... 11-176292

(51) Int. Cl.⁷ ................................................ H04N 1/50
(52) U.S. Cl. ...................... 358/1.1; 358/1.12; 358/1.18; 358/526
(58) Field of Search .......................... 358/1.1, 1.2, 1.4, 358/1.9, 3.26, 1.12, 1.18, 515, 526

(56) References Cited

U.S. PATENT DOCUMENTS 5,715,498 A  2/1998  Takeuchi et al.

FOREIGN PATENT DOCUMENTS

| EP | 0 478 005 A2 | 4/1992 |
| EP | 0 866 603 A2 | 9/1998 |
| EP | 0 866 603 A3 | 6/1999 |

*Primary Examiner*—Thomas D. Lee
*Assistant Examiner*—Stephen Brinich
(74) *Attorney, Agent, or Firm*—Antonelli, Terry, Stout & Kraus, LLP

(57) ABSTRACT

An image information changing part is added to correct image information of respective colors to be recorded according to information of errors among images to be combined so that color images may be combined exactly. An image recording method and an image recording apparatus having a high-speed, high-resolution and highly stable image combining method can be obtained.

6 Claims, 6 Drawing Sheets

IMAGE RECORDING METHOD AND IMAGE RECORDING APPARATUS

BACKGROUND OF THE INVENTION

The present invention relates to a method of recording images and an apparatus therefor, such as printers, facsimiles, and copying machines; and, more particularly, the invention relates to a method of recording multi-color images and an apparatus therefor.

In general, a multi-color image recording apparatus records multi-color images by combining a plurality of images of different colors. It has been well-known that full-color recording can be accomplished by combining three primary colors (cyan, magenta, and yellow). Most of the color image recording apparatuses provide a black color in addition these three primary colors to record full-color images. Although a black color can be made by mixing the three primary colors, a black color is added because it is frequently used (e.g. for characters) and plays a significant role in image formation.

For high-quality image recording by an image recording apparatus using three primary colors, it is required to combine the images of three primary colors precisely. Particularly when three primary colors are mixed to form fine characters and lines, a little deviation of the primary colors will degrade the quality of the images. To prevent this, a black color has been added and is used individually. It is needless to say that the deviation of colors must also be avoided in recording of multi-color images because such a deviation has a great influence on color reproduction and image quality.

A laser printer using an electrophotographic process has been widely used, since it is capable of fast and high-quality recording on various recording media. However, in color image recording in the electrophotographic process is hard to combine independent images of primary colors precisely, although a high-precision combination of color images is required.

It is very hard to achieve, with a high precision, a combination of color images particularly in a tandem recording system which is adapted to fast color image recording and uses a plurality of completely-independent color printing systems. Therefore, various means have been proposed to increase the color combining precision (the color overlapping accuracy).

For example, the publication "Four-Drum Digital Color El Electrophotographic System" (pp. 101–104, "Japan Hardcopy" '91, 1991) has been reported a method which provides two rotary polygon mirrors on a single motor shaft and causes a total of laser beams (two laser beams on each side) to scan at an identical speed in a four-color printing apparatus. This method has an effect to eliminate scanning errors of color images.

Japanese application patent laid-open publication No. Hei 7-160085 (1995) and Japanese application patent laid-open publication No. Hei 4-147280 (1992) have disclosed other methods involving the detecting of recording offsets of color images by positional sensors or the like and controlling the angles of mirrors in the laser optical systems and controlling a plurality of LED arrays.

Further, Japanese application patent laid-open publication No. Hei 7-168414 (1995) has disclosed a method of adjusting the parallelism of laser exposing units and exposure timing by providing detection windows on both sides of each laser exposing window, controlling the movement of each mirror so that each laser beam may scan along a preset scanning line and controlling the exposure start signal to match the exposure start timing of each exposure unit with a preset value. This method can control the position and timing of laser beams of the exposure units.

It is very hard to completely correct color offsets of color images even by the above-stated methods. This is partly because recent high-quality printing units have higher resolutions.

The typical resolution in color image recording is 600 dots per inch (dpi) or higher. At 600 dpi, pixels are recorded at a pitch of about 42 micrometers. It is mechanically hard to keep a steady pitch of 100 micrometers or less and, consequently, high-quality recording apparatuses becomes very expensive. This is also true of the above-stated recording apparatus having two rotary polygon mirrors on a single motor shaft.

Similarly, the control means and mechanisms which have been disclosed in Japanese application patent laid-open publication No. Hei 7-160085 (1995), Japanese application patent laid-open publication No. Hei 4-147280 (1992), and Japanese application patent laid-open publication No. Hei 7-168414 (1995) cannot avoid being complicated and expensive.

Further, a method disclosed in Japanese application patent laid-open publication No. Hei 7-168414 (1995), which precisely controls the position and exposure timing of each laser beam, is not able to improve the precision of combining color images into a multi-color image because the precision of combining color images in a tandem system is affected not only by deviations in laser beam positions and timing of exposure units, but also parallelism of the whole color printing systems and rotational speed errors of a photoconductive means.

As explained above, it is hard to say that the conventional methods can assure a satisfactory color combining precision; and, further, the conventional methods cannot be free from making the apparatuses complicated and expensive. Further, the conventional methods are apt to be affected by the environment and time lapses and cannot assure an optimum color positioning precision.

Furthermore, the world will want higher resolutions in a color recording apparatus which cannot be accomplished by conventional mechanical precision or precision control methods.

SUMMARY OF THE INVENTION

An object of the present invention is to provide an image recording method and an image recording apparatus which are comparatively inexpensive, and are high and stable in precision of color image combination for multi-color image recording apparatuses.

Another object of the present invention is to provide a fast, high image quality and in-expensive image recording apparatus and an image recording method.

In accordance with the present invention, to realize the above-stated objects, an image recording method of forming a plurality of color images and combining the color images according to a plurality of color image information comprises changing said color image information in response to error information and forming a multi-color image according to said changed color image information.

An image recording apparatus construction in accordance with the present invention comprises an error information detecting part which detects error information at a preset time point, an image information changing part which changes said color image information on the basis of said detected error information, and an image forming part which forms a multi-color image according to said changed color image information.

The above-stated image recording apparatus changes recording image information on the basis of error information of color images recorded on a recording media to get an optimum image position for each color on the recording medium. This facilitates minimization of deviation of color images on the recording medium when the images are combined even if image offsets are made on images of colors on the recording medium by mechanical errors of respective exposing units and respective printing units.

The above-stated image recording apparatus enables a color image recording unit to present a comparatively-inexpensive, high-precision and high-stable image recording method by color combination. Further, the above-stated image recording apparatus can present an image recording apparatus using the above-stated image recording method.

DESCRIPTION OF THE INVENTION

Various embodiments of an image recording method and an image recording apparatus according to the present invention will be described with reference to FIG. 1 through FIG. 10.

Figure 1:
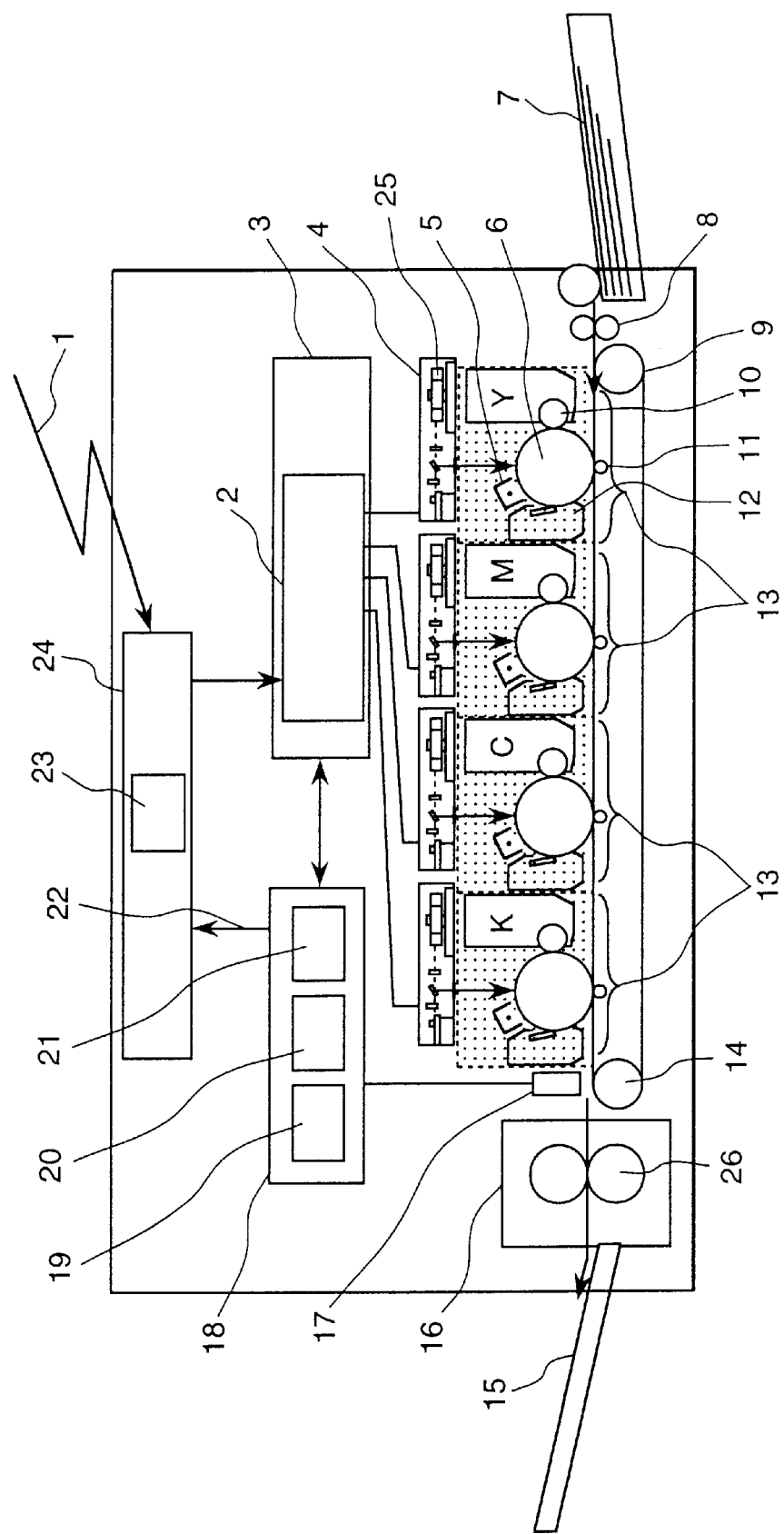
FIG. 1 is a sectional view of an image recording apparatus representing a first preferred embodiment of the present invention.

FIG. 1 is a sectional view of an image recording apparatus which represents a first embodiment of the present invention.

First, the printing mechanism and process of the image recording apparatus, which represents the first embodiment, will be described. The image recording apparatus in FIG. 1 comprises four printing units 13 each of which has a charger 5, an exposing part 4, a developer 10 and a cleaning mechanism 12 arranged around the periphery of a photo-sensitive member 6. The developer of each printing unit 13 respectively contains one of cyan, magenta, yellow, and black developing agents and each printing unit 13 forms an image of the color contained in the developer electrophotographically on the photosensitive member.

These printing units 13 are disposed along the path of the conveying transfer belt 9 which conveys a recording medium (e.g. a paper sheet). The conveying transfer belt 9 is driven by a belt support 14, and a fixing unit 16 comprising a pair of heating rollers 26 is disposed at the downstream end (on the paper ejection side) of the conveying transfer belt.

An electrophotographic method records an image on a recording medium by performing charging, exposing, developing, and transferring processes by means of the photosensitive member 6, the charger 5, the exposing part 4, the developer 10, and the transfer part 11.

In the above printing processes, the image recording apparatus takes a paper sheet from a paper supply cassette 7 which is provided at the upstream end of the conveying transfer belt 9, adjusts the paper feed timing using a resist mechanism 8, and electrostatically conveys the paper sheet on the conveying transfer belt 9 approximately horizontally.

While the paper sheet is conveyed on the belt, each printing, unit transfers an image of its color to the paper sheet under it. After receiving four color images, the paper sheet is fed into the fixing unit 16, heated and pressed by the hot rollers 26 to fix the images. Then, the paper sheet having the images fixed thereon is conveyed into the stacking tray 15 which is provided at the downstream side of the fixing unit 16.

For high-quality image recording, this printing process must transfer color images formed by the printing units 13 onto the paper sheet exactly. When the resolution of each printing process is 600 dots per inch (dpi), the dot pitch (interval) is about 42 micrometers and color images must be combined at a precision of some ten micrometers or less. However, it is very hard to dispose the independent printing units 13 with such a high precision.

In the image recording apparatus in accordance with this embodiment, each printing unit 13 has its own exposing unit 4. Each of the four exposing units 4 in this embodiment is a laser-beam scan type exposing unit which causes a laser beam to be scanned by a revolving polygon mirror 25 so as to expose the photosensitive member. In other words, this exposing unit 4 is what is used for typical laser printers.

To overlap the images formed by the four independent optical systems exactly (at a high precision), the rotational speeds of the rotary polygon mirrors 25 must be completely identical. However, it is extremely difficult to match the rotational speeds of the rotary polygon mirrors 25.

Further, the mirrors in the four independent optical systems must also be disposed exactly. The rotational speed of the polygon mirror greatly affects the width of an image. When the polygon mirror revolves faster, the dot pitch of the image becomes greater and the image becomes longer. On the other hand, when the polygon mirror revolves slower, the dot pitch of the image becomes smaller and the image becomes shorter. Further, a trifling angular difference among mirrors will cause an angular difference in main scanning directions of the printing units 13.

Further, the difference in rotational speeds of the photosensitive members 6 in the printing units 13 will affect the width of the image in the sub-scanning direction.

Therefore, the construction of this embodiment requires extremely high precisions in driving speeds, part production, and mounting positions of the printing units 13. However, even when the highest mechanical precision is obtained, the precision of combining images printed by the printing units 13 is only some hundred micrometers.

Also, in the embodiment of the image recording apparatus according to the present invention, the printing units 13 are disposed as exactly as possible. Further to realize a satisfactory color combining precision, the image recording apparatus in accordance with the present invention is equipped with an offset detecting part 17 which detects deviations of an image from the preset image starting position, image width and rotational angle in the main and subsidiary scanning directions. The offset detecting part 17 of the present embodiment comprises CCDs.

The detection of image offsets will be described in more detail.

In printing processes, the offset detecting part checks whether each printing unit is deviated from preset positions when the system starts up, when a preset number of paper sheets are printed or when a preset time period of printing has elapsed. For detection of image deviations, each printing unit 13 prints out reference marks (e.g. fine lines) on four areas (e.g. front right, front left, rear right, and rear left areas) of the conveying transfer belt 9. The offset detecting part (CCD) above the conveying transfer belt 9 detects the reference marks.

Figure 2:
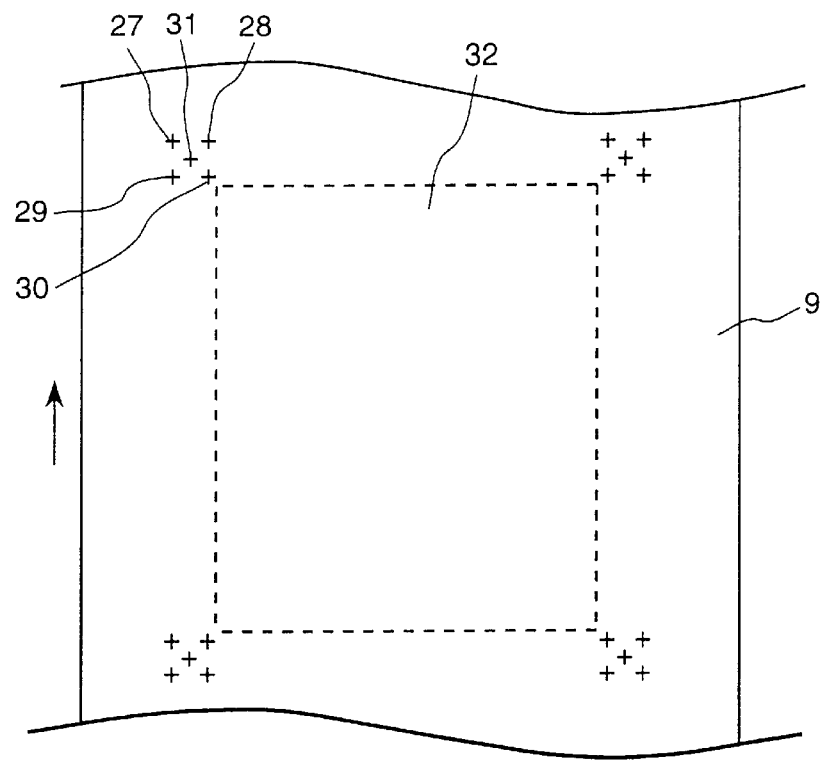
FIG. 2 is a diagram showing a layout of reference marks used to combine images of colors according to the present invention.

FIG. 2 illustrates one example of reference marks recorded on the surface of the conveying transfer belt 9 for detection of deviations of color images. The conveying transfer belt 9 has "+" reference marks 31 recorded in advance outside the image recording area 32 on the belt 9. The deviation of a "+" mark (27, 28, 29, or 30) printed by each printing unit 13 from the reference mark 31 is measured to determine the offset.

Figure 3:
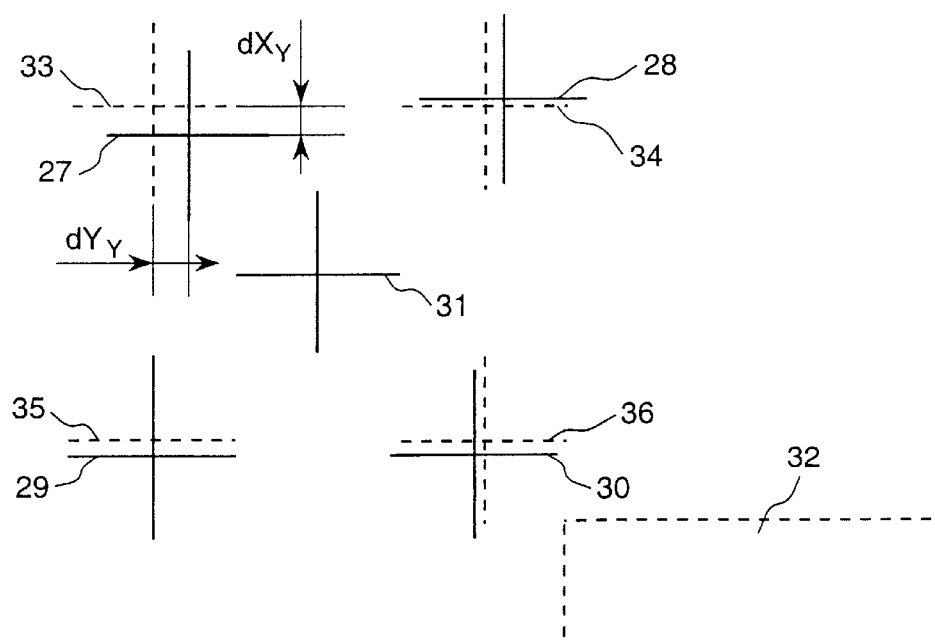
FIG. 3 is a diagram showing a magnified view of the reference marks of FIG. 2.

FIG. 3 illustrates a magnified view of the reference mark 31 and other "+" marks 27 through 30 printed by the printing units 13 on the conveying transfer belt 9. It is possible to match the "+" marks 27 through 30 with the reference "+" mark 31 at a proper time point.

However, this embodiment employs a method of detecting a deviation of each printing unit 13 by measuring the distance between the reference "+" mark 31 and each of the "+" marks 27 through 30 printed by the printing units 13 on the conveying transfer belt 9. This enables identification of "+" marks 27 through 30 printed by the printing units 13 by positions instead of by colors.

"+" marks 27, 28, 29, and 30 are respectively printed on the conveying transfer belt 9 by the yellow printing unit, by the magenta printing unit, by the cyan printing unit, and by the black printing unit in that order. These marks can be identified easily.

Further, this method enables independent recognition of the optimum location of each color mark relative to the reference. "+" mark printed on the conveying transfer belt 9. Even when the "+" marks 27 through 30 printed by the printing-units overlap each other, they can be easily identified and their deviations from the reference "+" mark 31 can be detected.

The dotted "+" 33 through 36 in FIG. 3 are virtual optimum positions for marks to be printed by the printing units 13. The differences (dXy and dYy) between the virtual optimum position (33, 34, 35, or 36) and the corresponding "+" mark printed by the corresponding printing unit respectively represent the amounts of deviations in the main and subsidiary scanning directions. This detection is made for each color.

Even if the printing units 13 print out different marks, the offset detecting unit (CCDs) 17 can identify the printed marks and detect their deviations relative to their optimum virtual positions by positions instead of colors. This method requires no color filter on the position detecting CCD and enables inexpensive high-precision position detection.

Although this embodiment uses a reference "+" mark 31 on the conveying transfer belt 9 for detection of deviations of marks printed by the printing units 13, this reference "+" mark 31 can be omitted when any of the "+" marks printed by the printing units 13 is used as a reference position mark for detection of deviations. However, in this case, the offset detecting unit cannot correct a deviation (offset) relative to the recording sheet.

As the required positional precision of an image on the sheet can be comparatively lower than the required precision of color deviations, the high-precision position control in accordance with this embodiment is not always required to control the image position relative to the conveying transfer belt 9.

The reference "+" mark 31 and the printed "+" marks 27 through 30 can be replaced by any marks or symbols such as "X", "V", "L", "Δ", "□", "○" and "◊" as long as the symbols can indicate exact positions in the main and subsidiary scanning positions.

This embodiment uses a total of four reference marks (one at each corner) around the image recording area. Generally, some reference marks which are fully separated from each other are required around the image recording area. The number and position of the reference marks can be determined according to the kinds and amounts of deviations. At least three marks are required to detect the positional deviation of an image pertaining to the starting position, width, and rotational angle of the image in the main and subsidiary scanning directions.

In addition to the detection timing described in connection with this embodiment, the positional deviation of images printed by the printing units 13 from the reference position can be detected also when the environment of the system changes by a preset value or more, after the system is maintained, or when a Detect Error Information command is entered from the operator panel or personal computer connected to the system.

It is recommended to determine the detection timing by experimentally checking the precision and stability of overlapping of the color images because the precision and stability of overlapping of the color images are greatly affected by structural factors of the system such as part precisions and strengths.

As long as the reference marks are printed outside the image recording area of the sheet on the conveying transfer belt 9, it is possible to perform both ordinary color printing and detection of positional deviation of images by the printing unit 13 simultaneously. This enables detection of a positional deviation of a color image just when it is printed by the corresponding printing unit, which is expected to make the image combining precision higher and more stable.

However, in general, image printing by respective printing units will not be affected so much by the printing of individual pages. Therefore, measurement of positional deviations, at a preset timing is enough.

As illustrated in FIG. 1, the image recording apparatus of this embodiment is equipped with an error information calculating part 18 which calculates the amount of deviation of each image from its reference position (which is error information containing image starting positions, image widths, and rotational angles in the main and subsidiary scanning directions) from data output from the offset detecting part (CCD) 17. This error information calculating part 18 further comprises a sensor control part 19, a printing sequence control part 21 (for detection of deviations), and an offset calculating part 20.

The image recording apparatus of this embodiment is also equipped with an image information changing part 24, which converts recorded image information data 1 containing information of color images sent from a personal computer or the like according to deviation information 22 which is the calculated error information. The printing process control part 3 controls the printing mechanism containing optical system control parts of respective colors by the converted data. With this, color images are printed on the recording sheet at a high precision.

Although the image recording apparatus in FIG. 1 uses the result of automatic detection by the CCD as information of deviations of the printing units 13 for conversion of exposure positions, the deviation information 22 can be stored in advance in memory 23 of the image information converting part 24 from the panel located in the image recording apparatus or from a personal computer connected to the system.

If the image recording apparatus is rigid enough to suppress deviations of images in combination, the deviation information 22 has only to be entered manually when the system is completed or installed. In this case, the offset detecting part 17 and the error information calculating part 18 in this embodiment are not required. Therefore, color images can be combined at a high precision in a simpler construction.

Figure 4:
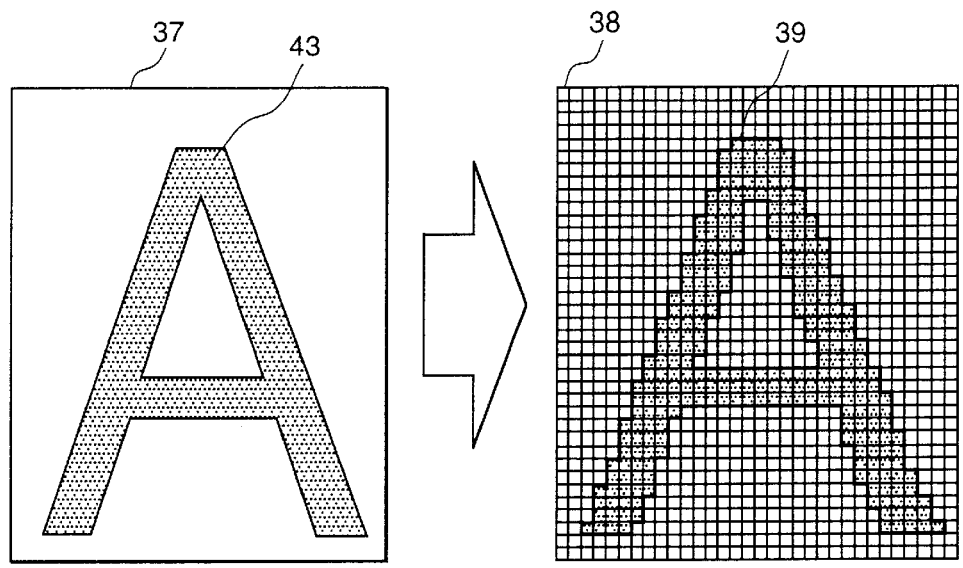
FIG. 4 is a diagram showing a relationship between bit positions and exposed bit positions in a lattice of a reference image.
Figure 5:
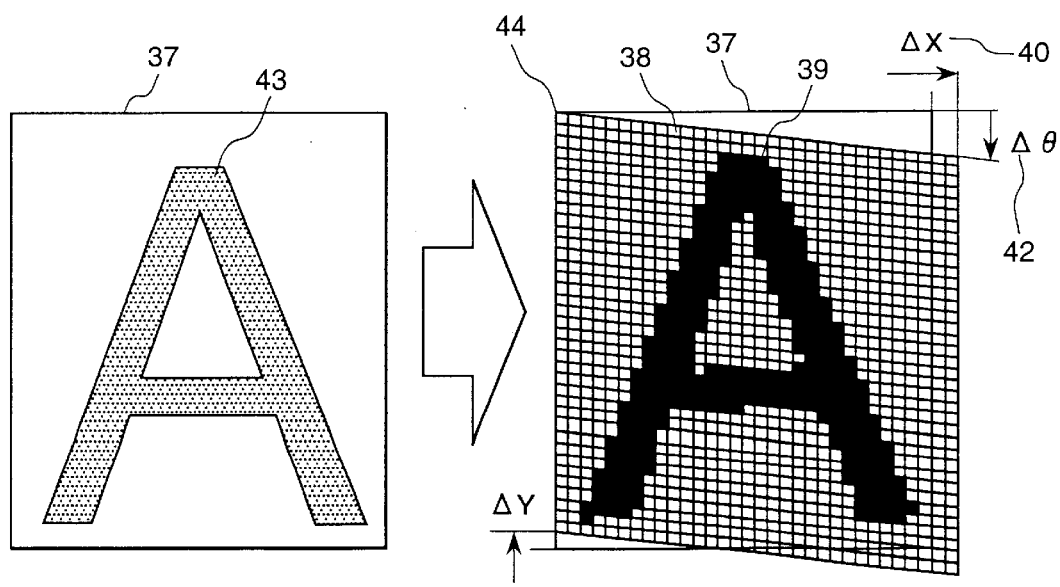
FIG. 5 is a diagram illustrating how the exposed bit positions are converted by the image information changing part of the present invention.
Figure 6:
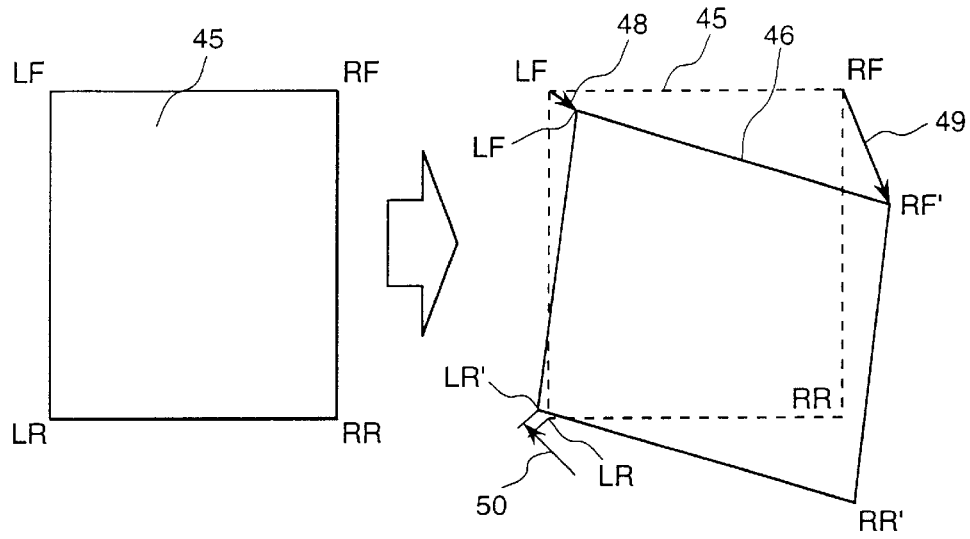
FIG. 6 is a diagram which shows an image deformation by the printing process of the present invention.
Figure 7:
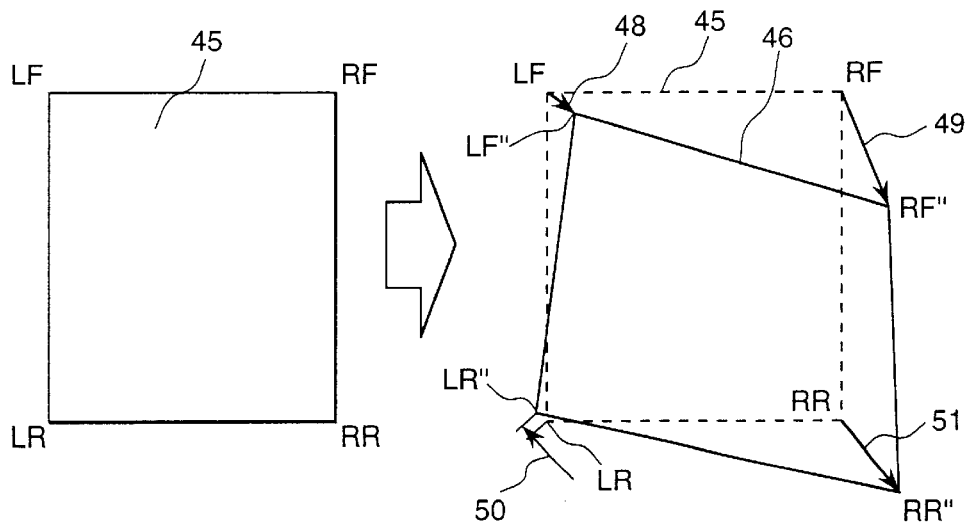
FIG. 7 is a diagram which shows an image deformation by the printing process of the present invention.

Next, a method of converting images according to the calculated deviation information will be explained with reference to FIG. 4 and FIG. 5. The lattice in FIG. 4 shows a reference dot lattice 38 used as a reference in exposure in main and subsidiary scanning directions. The dots painted black in the lattice are exposed dots to record character "A". FIG. 5 shows the reference dot lattice 38 which is skewed by main factors of the printing units. The frame 37 of the lattice shows the frame of the original lattice which is not skewed.

The skewed lattice frame 38 is elongated by "ΔX" 40 in the main scanning direction, shrunk by "ΔY" 41 in the subsidiary direction, and skewed back by "θ" 42 relative to the main scanning direction. When the character "A" is exposed dot by dot onto this skewed reference dot lattice 38 in the same manner as in FIG. 4, the character is also skewed.

To make the exposed character "A" as similar to the original character "A" 43 as possible, the exposing dot positions in the skewed lattice are changed. The dots painted black in the skewed lattice are new exposed dot positions after the change.

Next, a method of changing exposure positions will be explained below as an example. In FIG. 5, the frame 37 of a reference lattice shows the frame of a reference lattice which has not been skewed (in FIG. 4). The upper left corner of the skewed reference dot lattice 38 and the upper left corner of the original reference dot lattice 37 are on the same starting position 44. However, practically, the starting point 44 (the upper left corner) of the skewed lattice is not always on the upper left corner of the frame of the reference dot lattice 37.

Therefore, calculation of the exposed dot positions which closely match with the dot positions of the reference image (shown in FIG. 4) requires at least a magnification XM (%) of a dot pitch in the main scanning direction, a magnification YM (%) of a dot pitch in the subsidiary scanning direction, an angle of skew θX (degrees) relative to the main scanning direction, an angle of skew θY (degrees) relative to the subsidiary scanning direction, a positional deviation of the starting point XS (millimeters) in the main scanning direction, and a positional deviation of the starting point YS (millimeters) in the subsidiary scanning direction.

The exposed dot positions which closely match with the dot positions of the reference image (FIG. 5) can be easily calculated by detecting these values and performing general conversion of coordinates on them. In more detail, the coordinates of the exposure position after conversion to correct a combination of images are given by the function F below.

$$(X',Y')=F(XM, YM, \theta X, \theta Y, XS, YS, (X, Y))$$

wherein (X',Y') are the coordinates of the exposure position after conversion and (X,Y) are the coordinates of the exposure position before conversion.

All of these six terms pertaining to image deviation information need not always be used as default values because some of them are fixed or constant in certain exposing or printing methods. On the other hand, to correct a periodic image elongation or shrinkage (to be explained later), some terms may be added to the function.

Next, a method of calculating these six values pertaining to recording of the amounts of color deviations will be described. The amounts of positional deviations of images at the upper left, upper right, lower left, and lower right areas can be detected using the reference "+" mark 31 and other "+" marks 27 through 30 printed on the conveying transfer belt by the printing units.

The coordinates of four corner areas (upper left, upper right, lower left and lower right) of each color image can be represented as (dX,dY)LF, (dX,dY)RF, (dX,dY)LR, and (dX,dY)RR using the deviations (dX, dY) in the main and subsidiary scanning directions between the printed "+" mark of the color and the corresponding virtual dotted "+" mark (which is the expected optimum mark position of the color relative to the reference "+" mark) as illustrated in FIG. 3.

The positional deviation XS (millimeters) of the starting point in the main scanning direction and the positional deviation YS (millimeters) of the starting point in the subsidiary scanning direction are directly given as. the coordinates of the mark position in the upper left area.

XS=dXLF, YS=dYLF

The magnification XM (%) of a dot pitch in the main scanning direction and the magnification YM (%) of a dot pitch in the subsidiary scanning direction can be expressed by $$XM=1+(dXRF-dXLF)/XW$$

$$YM=1+(dYLR-dYLF)/YW$$

wherein

XW is a distance in the main scanning direction between reference marks on the conveying transfer belt (between the upper left reference mark and the upper right reference mark).

YW is a distance in the subsidiary scanning direction between reference marks on the conveying transfer belt (between the upper left reference mark and the lower left reference mark).

dXRF, dXLF, dYLR and dYLF are respectively a deviation of the upper left mark in the main scanning direction, a deviation of the upper left mark in the subsidiary scanning direction, a deviation of the upper right mark in the main scanning direction, and a deviation of the lower left mark in the subsidiary scanning direction in that order.

The angle of skew θX (degrees) relative to the main scanning direction, and the angle of skew EY (degrees) relative to the subsidiary scanning direction can be expressed by $$\theta X = ATN((dYRF-dYLF)/(XW+dXRF-dXLF))$$

$$\theta Y = ATN((dXLR-dXRF)/(YW+dYLR-dYRF))$$

wherein

XW is a distance in the main scanning direction between reference marks on the conveying transfer belt (between the upper left reference mark and the upper right reference mark).

YW is a distance in the subsidiary scanning direction between reference marks on the conveying transfer belt (between the upper left reference mark and the lower left reference mark).

dXLF, dYLF, dXRF, dYRF, dXLR, and dYLR are respectively deviations of the upper left, upper right, and lower left marks in the main and subsidiary scanning directions.

The deviation XS (millimeters) of a starting position in the main scanning direction, the deviation YS (millimeters) of a starting position in the subsidiary scanning direction, the magnification XM (%) of a dot pitch in the main scanning direction, the magnification YM (%) of a dot pitch in the subsidiary scanning direction, the angle of skew θX (degrees) relative to the main scanning direction, and the angle of skew θY (degrees) relative to the subsidiary scanning direction can be calculated from three coordinates (six kinds of information) (dX,dY)LF, (dX,dY)RF, and (dX,dY)LR which are positional deviations of the upper left, upper right, and lower left marks of the image.

Additionally, this embodiment uses the positional deviation (dX,dY)RR of the lower right mark for reconfirmation and fine adjustment of the result of calculation. Basically, images can be corrected by calculation of XS, YS, XM, YM, θX, and θY values from deviations of three points in the image when the rectangular image recording area 45 is skewed to form a parallelogram 46.

If the rectangular image recording area 45 is skewed to be a trapezoidal image area 47, deviations of corner points 48 through 51 or more points must be detected to correct such a distorted image area. Generally, such a trapezoidal distortion of the image area rarely happens and only few cases will require more than three points 48, 49, and 50 for detection of deviations.

By converting exposure positions according to the deviation of each color image printed by respective printing units which is the result of calculation, color images can be combined basically at a precision of 1 dot or less. Further, with the resolution enhancement technique which enhances the resolution in the scanning direction in the laser scanning optical systems, the substantial resolution can be increased greatly (by many times). This technique enables high-precision image combination.

As this embodiment gives a little angular deviation to the image, moire patterns may be generated in half-tone areas of the image. Such patterns can be easily eliminated by giving an adequate screening angle to the half-tone patterns of each color or improving half-tone patterns. Such techniques have been disclosed in "PostScript Screening" written by Peter Fing (NDN Corp.) published August, 1994 and others.

The method of correcting positional deviations of color images which is applied to the laser optical system of the first embodiment can also be applied to an image recording apparatus using various optical systems, such as LEDs or liquid crystal shutters. Although these exposure means can also use a similar correction of image optimum control methods should be applied to set and detect deviation information and image conversion methods fit for the exposure system.

Further, the use of the means for correcting deviations of color images in accordance with the present invention can also combine images which are made by optical systems of different resolutions or methods at comparatively high precisions.

The image conversion in accordance with the present invention is the simplest in conversion to a bit map for exposure. This method can be carried out while giving little influence to printing speeds and so on by employing a processing considering deviation information at the time of raster extraction which converts signals in a page description language like PostScript sent from a personal computer into a bit map for exposure.

When the image recording apparatus is connected to a personal computer running GDI (Graphic Device Interface) which performs bit-map conversion on an operating system such as Windows, it is preferential to apply the conversion processing in accordance with the present invention to the computer when the deviation information sent to the computer is bit-mapped.

Figure 8:
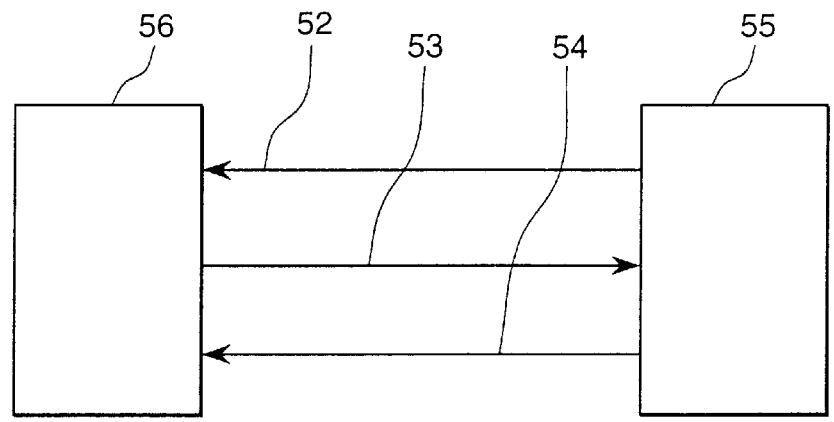
FIG. 8 is a block diagram showing how information is transferred between a personal computer and a printer according to the present invention.

FIG. 8 illustrates a model of this bit-map conversion. When receiving a print request 52 from the computer 55, the printer 56 sends deviation information 53 of combined images to the computer 55. The computer 55 receives the deviation information, creates bit-map information 54 for printing which eliminates deviations in image combination and sends this information to the printer 56.

The printer prints out according to said bit-map information. Naturally, it is possible to reconvert the bit-mapped and sent-back color image information into a bit map without color deviations. However, when the bit-mapped image information is reconvert, the deviation of the resulting information from the original image information becomes greater. Therefore, it is more effective in correction of color deviations to perform conversion of color deviations and bit-map conversion for printing simultaneously.

As this method corrects image information from positional information of actually-printed images and combines images exactly, it can be applied not only to exposure units using different methods (such as a laser exposing unit and a LED exposing unit) but also to exposure units of different resolutions.

Figure 9:
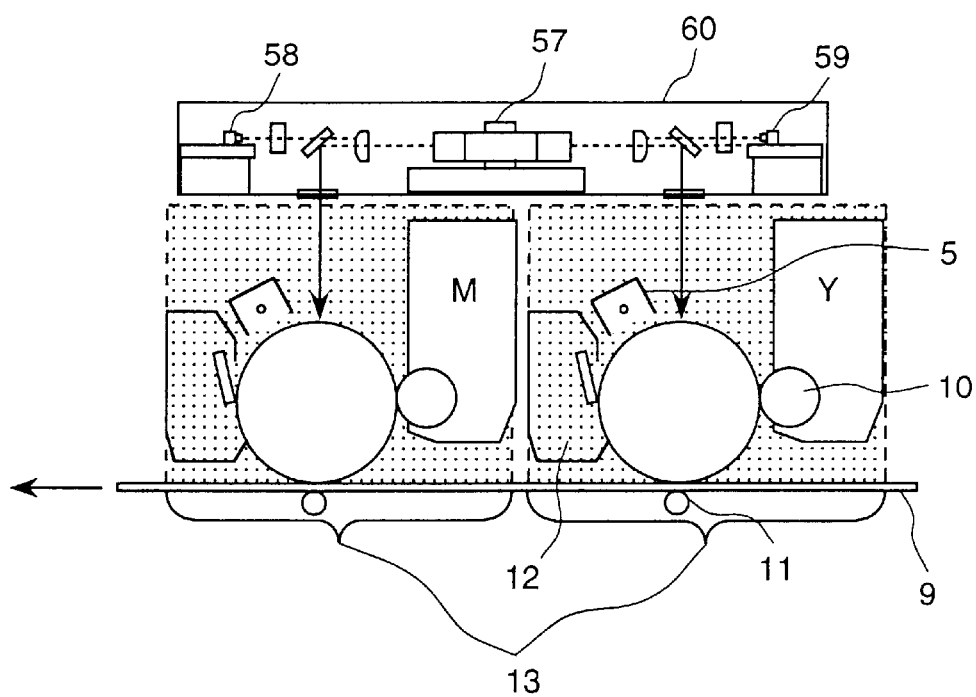
FIG. 9 is a sectional view of an exposing unit in the image recording apparatus according to the present invention.

FIG. 9 shows an image recording apparatus having a plurality of printing systems which represents an embodiment in accordance with the present invention.

FIG. 9 shows an exposure unit 60 which scans laser beams from two laser sources 58 and 59 using two opposite sides of a single rotary polygon mirror 57. This facilitates a high-precision image combination. In this exposure mechanism, the scanning direction of a laser beam coming from the right laser source is opposite to that of a laser beam coming from the left laser source and the parallelism of the scanned beams may easily be lost. However, the use of this method can easily accomplish high-precision formation of color images.

Further the laser exposing unit 60 in FIG. 9 using a single rotary polygon mirror to scan two laser beams can be smaller and less expensive than an exposure system using two rotary polygon mirrors (as illustrated in FIG. 1). With the use of this method, the mechanical tolerance of color combining parts can be less strict, which further reduces the design tolerances of exposing units and printing units. Consequently, this method can provide compact and inexpensive image recording apparatuses.

In addition to this mechanical image deviation, the printing system usually cannot be free from periodic elongation or shrinkage of images due to cyclic rotational fluctuations of photosensitive members and belt driving rollers. The method in accordance with the present invention also detects and corrects such cyclic image elongation and shrinkage, and accomplishes high-precision image recording.

However, it is needless to say that, basically, such cyclic image elongation and shrinkage should be as little as possible. Usually such cyclic image elongation and shrinkage are caused by cyclic rotational fluctuations of photosensitive members and belt driving rollers. They can be offset by matching the dot pitches of the outer peripheries of the photosensitive members, the outer peripheries of the belt-driving shafts, and the printing units or multiplying their pitches by integers to match and thus synchronizing the cyclic deviations.

To take this dimensional and proportional synchronization into consideration, in addition to high precision operation of the printing mechanism, is essential to a multi-color image recording apparatus having a plurality of printing units (as illustrated in FIG. 1).

Figure 10:
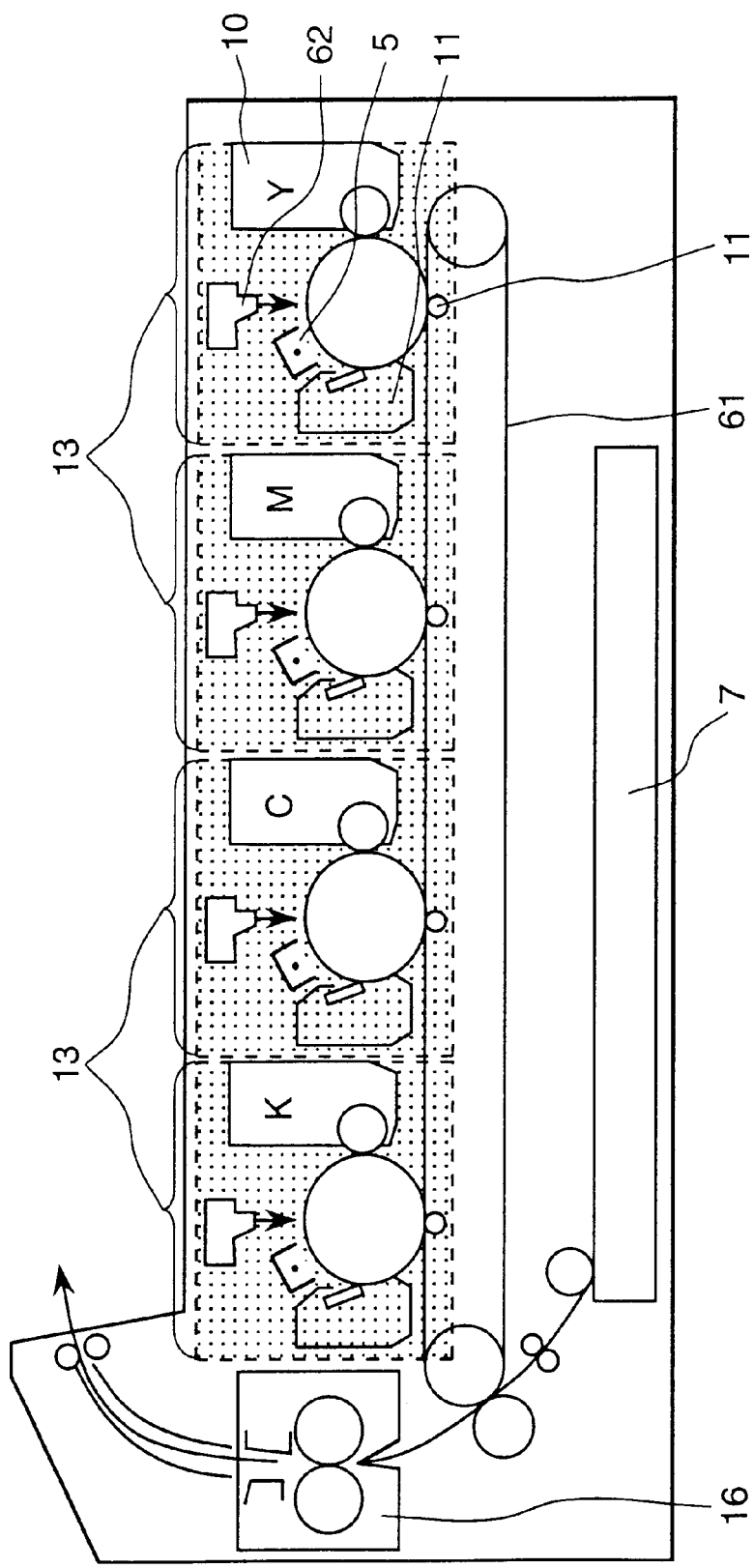
FIG. 10 is a sectional view of an image recording apparatus which represents another embodiment according to the present invention.

FIG. 10 illustrates a sectional view of an image recording apparatus which represents another embodiment of the present invention. The image recording apparatus in FIG. 10 as well as the system in FIG. 1 has four printing units, but this embodiment uses an intermediate transfer belt 61 instead of the conveying transfer belt 9.

Although the intermediate transfer belt 61 can be replaced by a drum-shaped transfer means, a belt-shaped transfer means is preferable to make the system compact when the system contains four photosensitive members as illustrated in the drawing. This method combines images of yellow, magenta, cyan, and black on the intermediate transfer belt 61 and transfers the resulting combined images onto a recording sheet at one time instead of combining the color images directly on the recording sheet attached to the conveying transfer belt. Therefore, this method need not consider any deviation of a recording sheet during movement.

Further, reference marks and images of the colors are printed and combined on the same intermediate transfer belt 61, which can offer high-precision and stable image combination. This construction is preferable to accomplish high-precision image combinations in an image recording apparatus having a plurality of printing systems each of which has a photosensitive member. Although the image printing system in FIG. 10 uses an led array head 62 in each optical system, naturally, it can be replaced by a laser exposing unit 4 or 60 as illustrated in FIG. 1 or FIG. 9.

In the above description, while this embodiment mainly uses employs a multi-color image recording apparatus using an electrophotographic process, this embodiment is also applicable to a multi-color image recording apparatus having single-color ink jet arrays, which form a color image by combining color images printed by the ink-jet heads of selected colors on an intermediate image forming member.

As described above, the present invention can provide a comparatively-inexpensive, high-precision, and highly stable image recording method using a combination of color images in a multi-color image recording apparatus. Further, the present invention can provide a fast, high-resolution, and inexpensive image recording apparatus.

What is claimed is:

1. An image recording method of forming a plurality of color images by forming a color image of different color on four photosensitive members according to each different color image information and by combining said color images on an intermediate transfer member, comprising the steps of:

providing a reference position mark, which is provided in advance, on said intermediate transfer member outside of a color image recording area;

forming a respective reference color image of a different color outside of said color image recording area with respect to said reference position mark by providing a predetermined interval with respect to said reference position mark at said color image of each color on each of said photosensitive members;

transferring said reference color image on said intermediate transfer member;

determining an error according to said reference position mark and said reference color image of each color;

storing said error of each color as error information;

changing said color image information using said error information; and forming a multi-color image according to said changed color image information.

2. An image recording method according to claim 1, wherein a position of said reference color image of each color with respect to said reference mark is established at a different position for each color.

3. An image recording method according to claim 1 or claim 2, wherein said color image information is changed using said error information when information of said plurality of color images, is converted into a recording bit map.

4. An image recording apparatus for forming a plurality of color images by forming a color image of a different color on four photosensitive members according to each of different color image information and by combining said color images on an intermediate transfer member, wherein the image recording apparatus comprises:

a reference position mark formation part forming a reference position mark in advance on said intermediate transfer member outside of a color image recording area;

a reference color image formation part for forming a respective reference color image of a different color outside of said color image recording area at a position with a predetermined interval with respect to said reference position mark;

a transfer part for transferring said respective reference color image of different color on said intermediate transfer member;

an error information detecting part for determining error information by detecting said reference mark and said respective reference color image of different color using CCD;

a color image information changing part for changing said color image information based on said determined error information; and a color image forming part for forming a multi-color image according to said changed color image information.

5. An image recording apparatus according to claim 4, wherein
said color image forming part comprises:
said four photosensitive members;
a charging means for evenly charging the surfaces of said four photosensitive members;
a plurality of exposing parts for forming electrostatic latent images respectively according to said color image information; and
a plurality of developing parts for respectively forming color images on said four photosensitive members.

6. An image recording apparatus according to claim 4, wherein
said error information detecting part performs a detection operation when the apparatus starts, when a preset time period passes by, when a preset number of image sheets are recorded, when the environment around the apparatus varies by a preset value or more, after the apparatus is maintained, or when a detect error information command is entered from outside.

* * * * *